United States Patent [19]

Zannucci et al.

[11] 4,265,804

[45] May 5, 1981

[54] ORIENTED POLYESTER ARTICLES HAVING IMPROVED ULTRAVIOLET STABILITY (III)

[75] Inventors: Joseph S. Zannucci, Kingsport; John M. Wininger, Blountville, both of Tenn.

[73] Assignee: Eastman Kodak Company, Rochester, N.Y.

[21] Appl. No.: 1,112

[22] Filed: Jan. 5, 1979

[51] Int. Cl.$^3$ .......................... C08K 5/34; C08K 5/35
[52] U.S. Cl. ...................... 260/45.8 NT; 260/45.8 N; 260/45.8 NZ; 260/45.8 SN; 264/290.2
[58] Field of Search ............... 260/45.8 NZ, 45.8 NT, 260/45.95 F, DIG. 35; 264/289, 290.2

[56] References Cited

U.S. PATENT DOCUMENTS

| | | | |
|---|---|---|---|
| 2,968,065 | 1/1961 | Gronholz | 264/289 |
| 3,043,709 | 7/1962 | Amborski | 260/45.95 F |
| 3,644,610 | 2/1972 | Buteux | 264/289 |
| 3,840,625 | 10/1974 | Yamamoto et al. | 264/289 |
| 3,864,354 | 2/1975 | Irick, Jr. et al. | 260/45.8 NZ |
| 3,889,039 | 6/1975 | Wainer | 260/DIG. 35 |
| 3,939,115 | 2/1976 | Wang et al. | 260/45.8 NZ |
| 3,957,813 | 5/1976 | Irick, Jr. et al. | 260/45.8 NZ |
| 3,963,738 | 6/1976 | Irick, Jr. et al. | 260/45.8 NZ |
| 3,981,884 | 9/1976 | Wang et al. | 260/45.8 NT |
| 4,000,148 | 12/1976 | Pond et al. | 260/45.8 NZ |
| 4,020,080 | 4/1977 | Irick, Jr. et al. | 260/45.8 NZ |
| 4,041,011 | 8/1977 | Pond et al. | 260/45.8 NT |
| 4,062,800 | 12/1977 | Irick, Jr. et al. | 260/45.8 NZ |
| 4,116,929 | 9/1978 | Pond | 260/45.8 NT |
| 4,126,660 | 11/1978 | Lempkowicz et al. | 264/289 |

*Primary Examiner*—Maurice J. Welsh
*Assistant Examiner*—R. A. White
*Attorney, Agent, or Firm*—Clyde L. Tootle; Daniel B. Reece, III

[57] ABSTRACT

This invention relates to oriented polyester shaped, molded, or formed objects having improved ultraviolet stability and to a process for producing the same and to compositions used in making such objects. More particularly, the invention relates to an oriented linear polyester film, fiber, foils, sheets, and other shaped, molded, or formed objects prepared from polyester compositions containing multichromophoric ultraviolet stabilizers which when oriented provide objects having improved weatherability. Multichromophoric ultraviolet stabilizers are those stabilizers which contain two or more moieties which, if isolated from one another, absorb a portion of the ultraviolet spectrum between 280 nm and 400 nm or an aromatic ester comprised of one or more of the above moieties and which on absorption of light the ester rearranges to a moiety which absorbs between 280 nm and 400 nm.

21 Claims, No Drawings

ORIENTED POLYESTER ARTICLES HAVING IMPROVED ULTRAVIOLET STABILITY (III)

This invention relates to oriented polyester films, fibers, foils, sheets and other shaped, molded or formed objects having improved ultraviolet stability and to a process for producing the same and to compositions used in making such objects. More particularly, the invention relates to an oriented linear polyester film, fiber, foils, sheets and other shaped, molded or formed objects prepared from polyester compositions containing multichromophoric ultraviolet stabilizers which when oriented provides objects having improved weatherability and processes for their preparation.

The degradative effects of ultraviolet light on various organic compositions are well known in the art. The photodeterioration or degradation is of particular concern with organic photo-degradable compositions which are exposed to ultraviolet light, such as sunlight, for long periods of time. One group of such photodegradable organic compositions is polyesters such as homo- and copolyesters. On exposure to sunlight for extended periods of time, polyester compositions degrade and their physical properties are reduced to render the polymeric composition less useful for most applications. Therefore, considerable effort has been directed to providing a solution to the photodegradation problem of polymeric compositions. As a result of this effort, there have been discovered many additives and stabilizers which greatly improve the outdoor weatherability of other various polymeric compositions, such as, for example, polypropylene and the like.

Moreover, while various additives and stabilizers exhibit the power to absorb electromagnetic radiation within the band of 2900 to 4000 A, and, when incorporated in various plastic materials such as transparent sheets, the resultant sheet acts as a filter for all the radiation passing through and will transmit only such radiations as are not absorbed by the sheet and/or the absorbing agent. It is thus possible to screen out undesirable radiation and utilize the resulting transparent sheet as a filter in many technical and commercial applications, such as wrappings for food products and the like.

While there are many additives, stabilizers and mixtures thereof which are known in the art to improve the ultraviolet light stability of various organic compositions, there is a need in the art for more efficient and effective stabilizers to prevent the photodegradation of polyester compositions susceptible to photodegradation over extended periods of time. Therefore, to provide a more effective and efficient ultraviolet stability for such polyester compositions susceptible to such degradation would be an advance in the state of the art.

It is, therefore, an object of the present invention to provide more effective and efficient ultraviolet light stabilized polyester compositions.

Another object of the present invention is to provide polyester objects characterized by improved resistance to ultraviolet degradation and deterioration.

It is still another object of the present invention to provide linear polyester films which have improved resistance to ultraviolet degradation.

It is a still further object of this invention to provide processes for providing oriented polyester objects having resistance to deterioration and degradation by actinic radiation and especially ultraviolet radiation.

It is a still further object of this invention to provide compositions and processes which can provide methods for improving the resistance of polyester materials to deterioration and degradation by actinic radiations, including short wave-length visible radiations.

Further objects and advantages of the invention will be apparent to those skilled in the art from the accompanying disclosure and claims.

In accordance with the present invention, oriented polyester objects are provided which are prepared from amorphous linear polyester compositions which contain multichromophoric ultraviolet stabilizers or ultraviolet screening agents. Those polyester compositions are shaped, molded or formed into objects and oriented. The terms oriented or orienting, as used throughout this specification, means stretching the object, such as film, foil, fiber, sheet or the like at a temperature near the glass transition temperature to provide molecular orientation in the film in one or more directions.

It is known that linear, amorphous polyesters such as poly(ethylene terephthalate) (PET) do not respond well to photo-stabilization when conventional ultraviolet stabilizers are used. Such conventional stabilizers known to the art are, for example, hydroxybenzophenones, which can be dispersed in the molten polyester followed by extrusion. Also, it has been disclosed in the art that poly(ethylene terephthalate) can be stabilized against photodegradation by dyeing stabilizers into oriented films using polyhydric alcohols and then treating the dyed films under prescribed conditions.

The process according to the present invention is applicable to any polyesters that are capable of being formed into oriented sheets and fibers. Our process involves extruding a polyester sheet containing 0.01–10% of a multichromophoric ultraviolet light stabilizer, orienting (either uniaxially or biaxially) the sheet or film and heat setting the oriented product under restraint. This orientation, uniaxially or biaxially, of the above films at temperatures between 185° F. and 215° F. greatly increases the weatherability of the films. Conventionally, 1 to 15-mil sheets of polyester are formed but we believe the invention is also applicable for thicker sheets (e.g., $\leq 150$ mil) as well.

One advantage of our process over the dyeing process is that we can use additives that are difficult to dye into the film because of insufficient solubility in the dyebath and/or because of the slow rates of diffusion of the stabilizer into the polymer. Also, we can use high molecular weight nonvolatile and nonextractable additives in our process and thereby get an improvement over existing products. Furthermore, it is less costly and less energy intensive to extrude the stabilizer into the film than to use a costly dyeing, washing, and drying process.

Polyesters useful in the present invention are prepared by reaction conditions well known in the art. These polyesters may be homopolyesters or copolyesters prepared by reacting a dibasic acid (or ester) or mixtures thereof with aliphatic glycols or glycol mixtures. Such dibasic acids are, for example: terephthalic acid, adipic acid, sebacic acid, p,p-sulfonyldibenzoic acid, 1,2- or 1,3- or 1,4-cyclohexanedicarboxylic acid, 1,4- or 1,5- or 2,7- or 2,6-naphthalenedicarboxylic acid, 4,4'-diphenic acid, 4,4'-benzophenonedicarboxylic acid, etc. Such glycols are, for example, polymethylene glycols containing 2 to 10 carbon atoms such as ethylene glycol, 1,2- or 1,3-propanediol, 1,2- or 1,3- or 1,4-cyclohexanedimethanol, neopentyl glycol, 1,5- or 2,4- pentanediol, 1,6- or 2,5-hexanediol, 1,3- or 2,3- or 1,4-butanediol, 2,2,4,4-tetramethylcyclobutane-1,3-diol, etc. Also modifying amounts of p-hydroxybenzoic acid or ether glycols such as, for example, diethylene glycol, poly(ethylene glycol), poly(propylene glycol) and poly(butylene glycol) may be added. Such polyesters may be amorphous or crystalline, they must be able to be formed into films, sheets or molded objects and have an ASTM (D648-56) 264 psi heat deflection temperature of <60° C. Such polyester moldable compositions are, for example, poly(ethylene terephthalate), poly(tetramethylene terephthalate) and the like. Such polyesters useful in this invention have an inherent viscosity of at least 0.4, preferably at least 0.4 to about 1.6 when measured at 25° C. using 0.50 grams of polymer per 100 ml. of a solvent composed of 60 volumes of phenol and 40 volumes of tetrachloroethane.

The multichromophoric ultraviolet stabilizers or screening agents are generally used in an amount of from 0.01 to 10%, by weight, based on the weight of the organic material to which they are added. While a detectable amount of ultraviolet screening and stabilization may be obtained with amounts less than 0.01%, this amount of stabilization or screening would be of little practical utility in a commercial application. Moreover, while amounts greater than 10%, by weight, provide effective ultraviolet stability and screening, such concentrations are undesirable because of cost and the deleterious effect which such concentrations may have on the mechanical properties of the organic composition in which the stabilizer is incorporated. Preferably, the stabilizer is used in an amount of from about 0.1 to about 3%, by weight. For example, an amount of 1.0%, by weight, of the stabilizer effectively stabilizes poly(ethylene terephthalate) film compositions.

The term "multichromophoric", as used in this application, implies that the stabilizers or absorbers contain two or more identifiable segments, either of which alone absorbs radiation in the solar ultraviolet region (290–400 nm), or that they contain one ultraviolet absorbing segment and a segment capable of forming a second ultraviolet absorbing segment upon absorption of ultraviolet radiation (e.g., by the well-known Fries Rearrangement). Such multichromophoric ultraviolet stabilizers or absorbers include, for example, esters of benzoxazolylbenzoic acid with 2,4-dihydroxybenzophenones such as 4-benzoyl-3-hydroxyphenyl-4-(2-benzoxazolyl)benzoate; ethers of benzoxazolylbenzyl halides with 2,4-dihydroxybenzophenones such as 2-hydroxy-4-(2-benzoxazolyl)benzyloxybenzophenone; phenyl esters of benzoxazolylbenzoic acid such as 3-methylphenyl4-(2-benzoxazolyl)benzoate; phenyl esters of 1,3,4-oxadiazole-2,5-dibenzoic acid such as di-(3-methylphenyl)-2,5-diphenyl-1,3,4-oxadiazole-4'4''-dibenzoate; aryl esters of 2-(4-hydroxyphenyl)benzotriazoles such as 4-(2-benzotriazolyl)-phenyl-4-tert octyl-benzoate and di-[4-(2-benzotriazolyl)phenyl terephthalate]; benzotriazolylphenyl-substituted ethers of 2,4-dihydroxybenzophenones such as 4-[4-(2-benzotriazolyl)phenoxyethoxy]-2-hydroxybenzophenone; resorcinol esters of benzoxazolylbenzoic acid such as resorcinol di[4-(2-benzoxazolyl)benzoate]; phenyl esters of 1,3,4-oxadiazole-2-benzoic acid such as 3-methylphenyl 4-(5-phenyl-1,3,4-oxadiazol-2-yl)benzoate; benzotriazolylphenyl-substituted ethers of 4-hydroxystyrenes such as dimethyl 4-[4-(2-benzotriazotriazolyl)phenoxyethoxy]benzylidenemalonate; and benzoxazolylphenyl-substituted ethers of 4-hydroxystyrenes such as dimethyl 4-[4-(2-benzoxazolyl)benzoyloxyethoxy] benzylidenemalonate.

Such multichromophoric ultraviolet stabilizers or absorbers useful in the present invention are described in U.S. patents such as, for example: U.S. Pat. No. 3,864,354; U.S. Pat. No. 3,936,418; U.S. Pat. No. 3,936,419; U.S. Pat. No. 3,939,115; U.S. Pat. No. 3,954,706; U.S. Pat. No. 3,957,813; U.S. Pat. No. 3,963,738; U.S. Pat. No. 3,981,822; U.S Pat. No. 3,981,884; U.S. Pat. No. 3,988,295; U.S. Pat. No. 4,000,148; U.S. Pat. No. 4,017,508; U.S. Pat. No. 4,020,041; U.S. Pat. No. 4,020,080; U.S. Pat. No. 4,024,153; U.S. Pat. No. 4,029,670; U.S. Pat. No. 4,041,011; U.S. Pat. No. 4,043,973; U.S. Pat. No. 4,062,800; U.S. Pat. No. 4,065,427; U.S. Pat. No. 4,069,227; U.S. Pat. No. 4,070,337; U.S. Pat. No. 4,070,339; U.S. Pat. No. 4,073,745; U.S. Pat. No. 4,075,162; U.S. Pat. No. 4,075,220; U.S. Pat. No. 4,076,687; U.S. Pat. No. 4,085,089; U.S. Pat. No. 4,089,874; U.S. Pat. No. 4,096,115; the disclosures of which are incorporated herein by reference.

Such specific stabilizers of the multichromophoric type include, for example: 3-hydroxy-4-benzoylphenyl 4-(2-benzoxazolyl)benzoate; 2-hydroxy-4-[(2-benzoxazolyl)benzyloxy]-benzophenone; 4-methoxyphenyl 4-(2-benzoxazolyl)benzoate; dimethyl 4-[4-(2-benzoxazolyl)benzoyloxy]-benzylidenemalonate; 2,4-di-tert-butylphenyl 4-[5-(4-methoxyphenyl)-1,3,4-oxadiazol-2-yl]-benzoate; 2-(2-benzoyloxy-5-methylphenyl)-benzotriazole; and 2-(4-benzoyloxyphenyl)benzotriazole; and such specific stabilizers are Compounds I to XXIX, as follows:

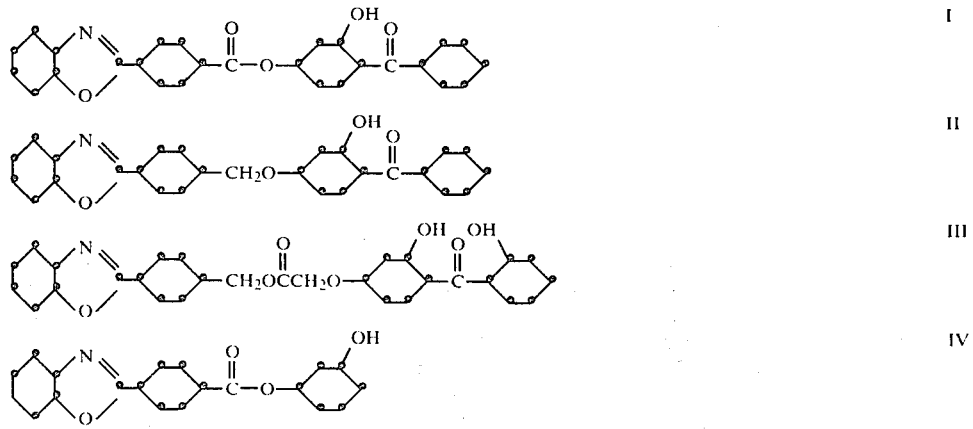

-continued
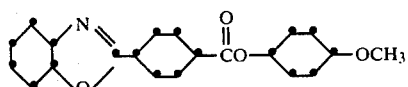 V
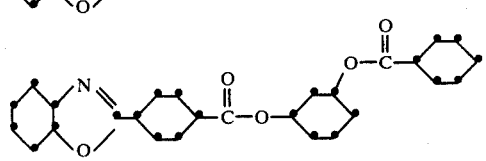 VI
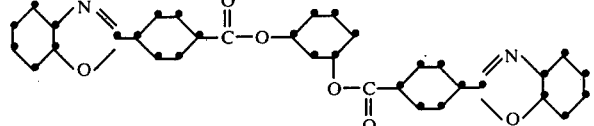 VII
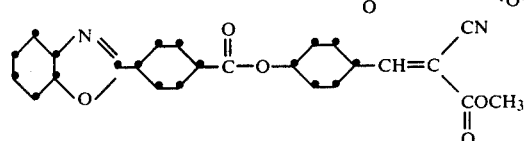 VIII
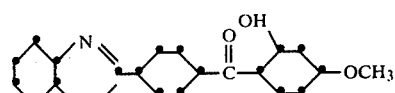 IX
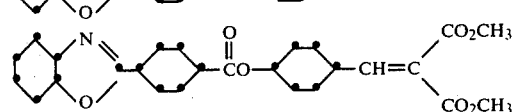 X
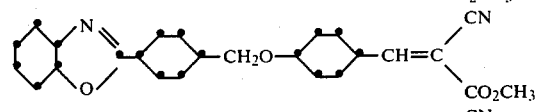 XI
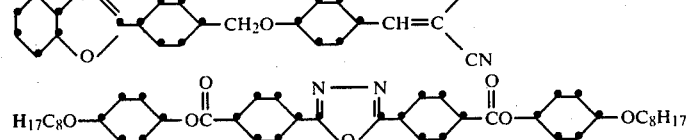 XII
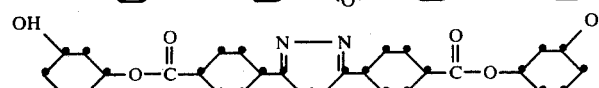 XIII
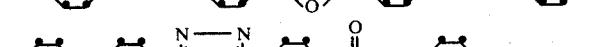 XIV
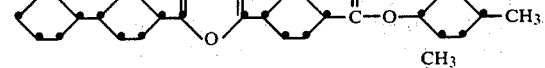 XV
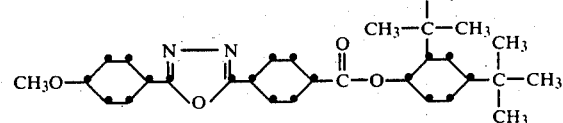 XVI
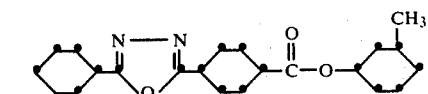 XVII
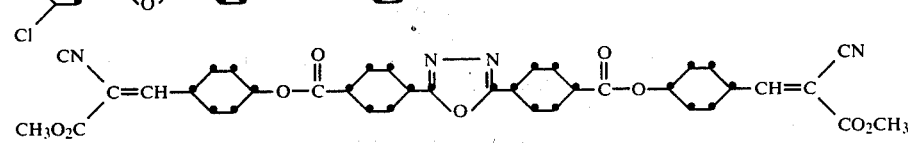 XVIII
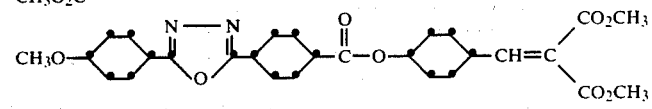 XIX
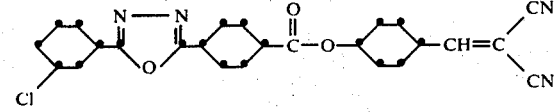 XX -continued

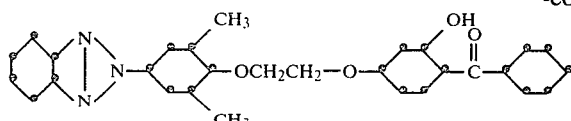 XXI

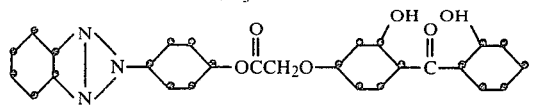 XXII

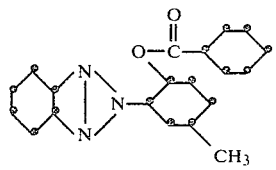 XXIII

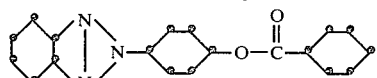 XXIV

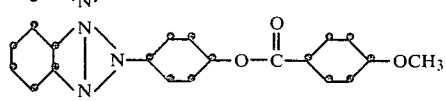 XXV

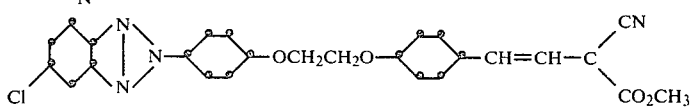 XXVI

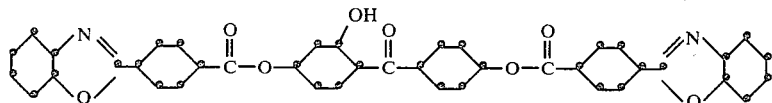 XXVII

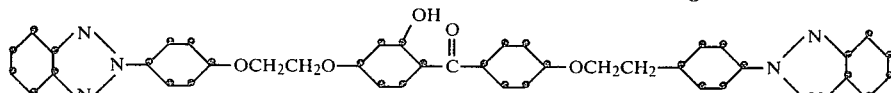 XXVIII

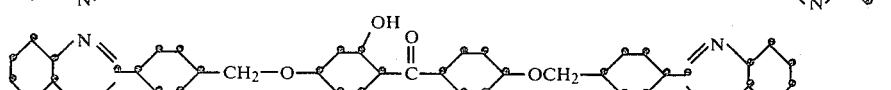 XXIX

The ultraviolet stabilized organic compositions containing the stabilizers of the present invention may also contain other additives, pigments, colorants, stabilizers and the like. For example, polyesters may also contain and generally do contain other additives such as white or colored pigments or colorants, antioxidants (such as phosphites), plasticizers, flow aids, processing aids, polymeric modifiers and the like.

These multichromophoric ultraviolet stabilizers may be incorporated into organic compositions by melt-blending or may be added onto the surface of an organic plastic material prior to being molded or extruded into a suitable object, or added to the surface of the molded object.

These polyester moldable compositions can be formed into objects by any extrusion or injection molding means well known to the art. After the molding or extrusion operation the object can be oriented by means and processes also known to the art for orienting plastics.

This invention will be further illustrated by the following examples, although it will be understood that these examples are included merely for purposes of illustration and are not intended to limit the scope of the invention.

EXAMPLE 1

Poly(ethylene terephthalate) having an inherent viscosity of 0.56 and a weight average molecular weight of 40,000 g/mol does not respond well to photostabilization when the usual methods of polymer stabilization are applied; that is, dispersion of the stabilizer in the polymer melt followed by extrusion of the polymer into sheeting. For example, pellets of I were coated with ultraviolet light stabilizers and the resulting mixtures were extruded into 15- to 30-mil thick films. These amorphous films were irradiated in a Uvatest weathering device and the times to embrittlement of the films noted (Table 1). Embrittlement was determined by bending the films 180° around a ⅛" mandrel. Although the formulations stabilized with multichromophoric compounds are more stable than the formulations containing conventional stabilizers, they are not considered good enough for outdoor applications.

TABLE 1

Stability of Amorphous Poly(Ethylene Terephthalate) Films Containing Selected Stabilizers[1]

| Additive[2] | Hours to Embrittlement |
| --- | --- |
| None | 288 |
| 4-Dodecyloxy-2-hydroxybenzophenone | 480 |
| 2,2'-Dihydroxy-4,4'-dimethoxybenzophenone | 816 |
| 2-[4-Benzoyl-3-hydroxy-phenoxymethyl) | 1500 |

TABLE 1-continued

Stability of Amorphous Poly(Ethylene Terephthalate) Films Containing Selected Stabilizers[1]

| Additive[2] | Hours to Embrittlement |
|---|---|
| phenyl]benzoxazole | |
| 4-Benzoyl-3-hydroxyphenyl p-(2-benzoxazolyl)benzoate | 1700 |

[1]Samples were irradiated in a Uvatest weathering device which is an ultraviolet weathering device with fluorescent lamps (310-366 nm) manufactured by Geopar Ind., Ludlow, Massachusetts.
[2]Additive concentration is 0.6%.

EXAMPLE 2

Stabilized poly(ethylene terephthalate) sheeting was prepared by extruding the stabilizer in the polyester at 265°–275° C. The extruded sheeting (15- to 30-mils thick) was cut into 4⅜-in. squares and oriented at 185° F. to 215° F. using the Film Stretcher (T. M. Long Company, Inc., Somerville, New Jersey).

The films were then heatset for 10 minutes at temperatures between 145° C. and 210° C. while being held under restraint.

Strips (½"×3") of the above films were stapled to white 4"×6" cards and irradiated in a Uvatest (Geopar Industries, Ludlow, Massachusetts) weathering device until brittle.

We found that orientation (either uniaxially or biaxially) of the above films at various temperatures provided improved weatherability and particularly orientation at temperatures between 185° F. and 215° F. which are normally used in conventional polymer orientation processes, greatly increased weatherability of the films. The times to embrittlement of these films, regardless of the stabilizers used, were at least twice that of the unoriented film (Table 2). The stabilizers are the compounds I to XXIX identified hereinbefore as examples of useful multichromophoric ultraviolet stabilizers or absorbers.

TABLE 2

Stability of Crystalline Oriented Poly(Ethylene Terephthalate) Films Containing Selected Stabilizers[1, 2]

| Stabilizer[3] | Type of[4] Orientation | Improvement[5] Factor |
|---|---|---|
| I | U | >6 |
|  | B | >6 |
| II | U | >6 |
|  | B | >6 |
| III | U | >5 |
|  | B | >5 |
| IV | U | >5 |
|  | B | >5 |
| V | U | >5 |
|  | B | >5 |
| VI | U | >5 |
|  | B | >5 |
| VII | U | >6 |
|  | B | >6 |
| VIII | U | >5 |
|  | B | >5 |
| IX | U | >5 |
|  | B | >5 |
| X | U | >5 |
|  | B | >5 |
| XI | U | >6 |
|  | B | >6 |
| XII | U | >6 |
|  | B | >6 |
| XIII | U | >6 |
|  | B | >6 |
| XIV | U | >6 |
|  | B | >6 |
| XV | U | >5 |
|  | B | >5 |
| XVI | U | >5 |
|  | B | >5 |
| XVII | U | >5 |
|  | B | >5 |
| XVIII | U | >6 |
|  | B | >6 |
| XIX | U | >5 |
|  | B | >5 |
| XX | U | >5 |
|  | B | >5 |
| XXI | U | >5 |
|  | B | >5 |
| XXII | U | >6 |
|  | B | >6 |
| XXIII | U | >5 |
|  | B | >5 |
| XXIV | U | >5 |
|  | B | >5 |
| XXV | U | >5 |
|  | B | >5 |
| XXVI | U | >6 |
|  | B | >6 |
| XXVII | U | >6 |
|  | B | >6 |
| XXVIII | U | >6 |
|  | B | >6 |
| XXIX | U | >6 |
|  | B | >6 |

[1]Samples were irradiated in a Uvatest weathering device.
[2]Density of polyester films ranged from 1.36 to 1.39.
[3]Stabilizer concentration is 0.6%.
[4]U = 300% uniaxially oriented; B = 300% biaxially oriented.
[5]Improvement factor = hours to embrittlement of oriented stabilized film/hours to embrittlement of unoriented stabilized polymer.

EXAMPLE 3

As noted hereinabove, one prior art method for providing ultraviolet light stability to an oriented polyester film is to dye the film with a conventional stabilizer. In Example 3, we have practiced the above-mentioned prior art method on an oriented poly(ethylene terephthalate) film and found that the resulting film is quite stable to ultraviolet light (Table 3), although not as stable as our formulations shown in Table 2.

TABLE 3

Stability of Poly(Ethylene Terephthalate) Films Dyed with Uvinul 490[1,2]

| Film | Hours to Embrittlement |
|---|---|
| Experimental Dyed Film[3] | 2450 |
| Commercial Dyed Film A[4] | 2500 |
| Commercial Dyed Film B[5] | 3200 |

[1]Samples were irradiated in a Uvatest weathering device.
[2]GAF trademark of a stabilizer that is primarily 2,2'-dihydroxy-4,4'-dimethoxybenzophenone.
[3]Film dyed using procedure described in U.S. 3,943,105.
[4]Martin Processing, Inc., UV-X Weatherable Film.
[5]Martin Processing, Inc., Martin Clear/Weather Resistant Type UV-X Polyester Film.

The advantage of our process over the dyeing process is that we can use additives that are difficult to dye into the film because of insufficient solubility in the dyebath and/or because of the slow rates of diffusion of the stabilizer into the polymer (i.e., α-[4-benzoyl-3-hydroxy-phenoxymethyl)phenyl]benzoxazole) or polymeric stabilizers. Also, we can use high molecular weight nonvolatile and nonextractable additives in our process and thereby get an improvement over existing products. Furthermore, it is less costly to extrude the stabilizer into the film than to use a costly dyeing, washing, and drying process.

EXAMPLE 4

Our process is applicable to other polyesters that are capable of being formed into sheeting and fibers. For example, multichromophoric stabilizers can be extruded into "Kodar" PETG polyester having an inherent viscosity of 0.69 and a weight average molecular weight of about 55,000 g/mol, the resulting film oriented and heat set to form a stable sheeting (Table 4). "Kodar" PETG polyester is a copolyester prepared from mixtures of ethylene glycol and 1,4-cyclohexane dimethanol in a molar ratio of about 80:40 to 40:80 with terephthalic acid. The multichromophoric stabilizers are the compounds identified hereinbefore.

TABLE 4

Stability of "Kodar" PETG Polyester Films Containing Selected Stabilizers[1, 2]

| Stabilizer[3] | Type of[4] Orientation | Improvement[5] Factor |
|---|---|---|
| I | U | >6 |
|  | B | >6 |
| II | U | >6 |
|  | B | >6 |
| VII | U | >6 |
|  | B | >6 |
| XI | U | >5 |
|  | B | >5 |
| XIII | U | >6 |
|  | B | >6 |
| XVIII | U | >5 |
|  | B | >5 |
| XXI | U | >5 |
|  | B | >5 |

[1]Samples were irradiated in a Uvatest weathering device.
[2]Oriented films were heatset at 125° C. while being held under restraint.
[3]Additive concentration is 0.6%.
[4]U = 300% uniaxially oriented; B = 300% biaxially oriented.
[5]Improvement factor = hours to embrittlement of oriented stabilized film/hours to embrittlement of unoriented stabilized polymer.

The invention has been described in detail with particular reference to preferred embodiments thereof, but it will be understood that variations and modifications can be effected within the spirit and scope of the invention.

We claim:

1. A process for improving the weatherability and ultraviolet light stability of polyester objects comprising (1) forming said object from a polyester extrudable composition having an inherent viscosity of at least 0.4 and a 264 psi heat deflection temperature greater than 60° C. containing about 0.01 to about 10 percent by weight of at least one multichromophoric ultraviolet light stabilizer compatible with said polyester composition and (2) orienting said polyester object thereby improving the ultraviolet stability at least twice of said unoriented object.

2. A process for improving the weatherability and ultraviolet light stability of polyester objects according to claim 1 wherein said multichromophoric ultraviolet light stabilizer contains at least one ester of benzoxazolylbenzoic acid with a 2,4-dihydroxybenzophenone.

3. A process for improving the weatherability and ultraviolet light stability of polyester objects according to claim 1 wherein said multichromophoric ultraviolet light stabilizer contains at least one ether of a benzoxazolylbenzyl halides with 2,4-dihydroxybenzophenone.

4. A process for improving the weatherability and ultraviolet light stability of polyester objects according to claim 1 wherein said multichromophoric ultraviolet light stabilizer contains at least one phenyl ester of benzoxazolylbenzoic acid.

5. A process for improving the weatherability and ultraviolet light stability of polyester objects according to claim 1 wherein said multichromophoric ultraviolet light stabilizer contains at least one phenyl ester of 1,3,4-oxadiazole-2,5-dibenzoic acid.

6. A process for improving the weatherability and ultraviolet light stability of polyester objects according to claim 1 wherein said multichromophoric ultraviolet light stabilizer contains at least one aryl ester of a 2-(4-hydroxyphenyl)-benzotriazole.

7. A process for improving the weatherability and ultraviolet light stability of polyester objects according to claim 1 wherein said multichromophoric ultraviolet light stabilizer contains at least one benzotriazolylphenyl-substituted ether of a 2,4-dihydroxybenzophenone.

8. A process for improving the weatherability and ultraviolet light stability of polyester objects according to claim 1 wherein said multichromophoric ultraviolet light stabilizer contains at least one resorcinol ester of benzoxazolylbenzoic acid.

9. A process for improving the weatherability and ultraviolet light stability of polyester objects according to claim 1 wherein said multichromophoric ultraviolet light stabilizer contains at least one phenyl ester of 1,3,4-oxadiazole-2-benzoic acid.

10. A process for improving the weatherability and ultraviolet light stability of polyester objects according to claim 1 wherein said multichromophoric ultraviolet light stabilizer contains at least one benzotriazolylphenyl-substituted ether of a 4-hydroxystyrene.

11. A process for improving the weatherability and ultraviolet light stability of polyester objects according to claim 1 wherein said multichromophoric ultraviolet light stabilizer contains at least one benzoxazolylphenyl-substituted ether of a 4-hydroxystyrene.

12. A process for improving the weatherability and ultraviolet light stability of polyester objects according to claim 2 wherein said multichromophoric ultraviolet light stabilizer is 4-benzoyl-3-hydroxyphenyl-4-(2-benzoxazolyl)-benzoate.

13. A process for improving the weatherability and ultraviolet light stability of polyester objects according to claim 3 wherein said multichromophoric ultraviolet light stabilizer is 2-hydroxy-4-(2-benzoxazolyl)benzyloxybenzophenone.

14. A process for improving the weatherability and ultraviolet light stability of polyester objects according to claim 4 wherein said multichromophoric ultraviolet light stabilizer is 3-methylphenyl 4-(2-benzoxazolyl)-benzoate.

15. A process for improving the weatherability and ultraviolet light stability of polyester objects according to claim 5 wherein said multichromophoric ultraviolet light stabilizer is di-(3-methylphenyl)-2,5-diphenyl-1,3,4-oxadiazole-4′4″-dibenzoate.

16. A process for improving the weatherability and ultraviolet light stability of polyester objects according to claim 6 wherein said multichromophoric ultraviolet light stabilizer is a member of the group consisting of 4-(2-benzotriazolyl)phenyl-4-tert-octyl-benzoate and di-[4-(2-benzotriazolyl)-phenyl terephthalate.

17. A process for improving the weatherability and ultraviolet light stability of polyester objects according to claim 7 wherein said multichromophoric ultraviolet light stabilizer is 4-[4-(2-benzotriazolyl)phenoxy-ethoxy]-2-hydroxybenzophenone.

18. A process for improving the weatherability and ultraviolet light stability of polyester objects according to claim 8 wherein said multichromophoric ultraviolet light stabilizer is resorcinol di[4-(2-benzoxazolyl)benzoate].

19. A process for improving the weatherability and ultraviolet light stability of polyester objects according to claim 9 wherein said multichromophoric ultraviolet light stabilizer is 3-methylphenyl 4-(5-phenyl-1,3,4-oxadiazol-2-yl)benzoate.

20. A process for improving the weatherability and ultraviolet light stability of polyester objects according to claim 10 wherein said multichromophoric ultraviolet light stabilizer is dimethyl 4-[4-(2-benzotriazotriazolyl)-phenoxyethoxy]benzylidenemalonate.

21. A process for improving the weatherability and ultraviolet light stability of polyester objects according to claim 11 wherein said multichromophoric ultraviolet light stabilizer is dimethyl 4-[4-(2-benzoxazolyl)benzoyloxyethoxy]-benzylidenemalonate.

* * * * *